United States Patent [19]
Tominaga et al.

[11] 4,327,979
[45] May 4, 1982

[54] DATA RECORDING DEVICE FOR CAMERAS

[75] Inventors: Shinji Tominaga; Toshiaki Matsumoto, both of Osaka, Japan

[73] Assignee: Minolta Camera Kabushiki Kaisha, Osaka, Japan

[21] Appl. No.: 213,768

[22] Filed: Dec. 8, 1980

[30] Foreign Application Priority Data

Dec. 10, 1979 [JP] Japan ............................. 54-159942

[51] Int. Cl.³ .............................................. G03B 17/24
[52] U.S. Cl. ...................................... 354/105; 354/25; 354/109; 354/195
[58] Field of Search ............... 354/25 R, 105, 106, 354/107, 108, 109, 195

[56] References Cited

U.S. PATENT DOCUMENTS 3,889,281 6/1975 Taguchi et al. .................. 354/109
3,953,868 4/1976 Kawamura et al. .............. 354/109
4,025,931 5/1977 Taguchi et al. .................. 354/105
4,235,544 11/1980 Yamada et al. .................. 354/106

Primary Examiner—Russell E. Adams
Attorney, Agent, or Firm—Wolder, Gross & Yavner

[57] ABSTRACT

For a photographic lens movable from a first position toward a second position by a shutter release action, the first position is set outside the actual focusing range of the lens from the nearest focused position to the infinity focused position to render the lens pre-movable over a specified distance from the first position to the actual focusing range. Lens position signal generating means operatively related to the movement of the lens generates an electric signal corresponding to the position to which the lens is moved. During the pre-movement of the lens, the position signal generating means emits a signal for initiating a data recording light source into operation so that the light source can be lighted for a substantially prolonged period of time.

6 Claims, 5 Drawing Figures

DATA RECORDING DEVICE FOR CAMERAS

BACKGROUND OF THE INVENTION

The present invention relates to a data recording device for cameras which has a light source incorporated therein and which is adapted to record on the film the desired data, such as the date of taking a photograph, and more particularly to a data recording device for use in a camera having an automatic focusing mechanism which emits a signal for actuating the device.

As disclosed in Japanese Utility Model Publication No. 15478/1975, conventional data recording devices for cameras are initiated into a data recording operation by a switch operatively associated with a specific mechanical movement, such as a shutter release action of the camera. The switch or like member needed for actuating the device renders the input assembly for the device complex in construction. Since the exposure for recording data generally requires a longer period of time than exposures for taking usual photographs owing to limitations on the size of the light source lamp, the capacity of the power supply battery and the optical system for the device, the recording device is provided with safety means for eliminating the likelihood that the film will be wound up before the completion of data recording operation. The safety device nevertheless makes the camera complex in construction and renders the camera unable to take photographs in succession at a high speed.

As disclosed in U.S. Pat. No. 4,025,931, other data recording devices are known which are actuated by an electric signal emitted by the control circuit for an electronic shutter, for example, by an electric signal for de-energizing a shutter closing electromagnet in the exposure controlling timer circuit, or by an electric signal momentarily available when a shutter release member returns. Although such devices have an input assembly of simple construction, data must be recorded on the film after the shutter has been closed but before the film is wound up. Otherwise, the data would be recorded on the film in the form of a blurred image. Accordingly the data exposure time is limited to a relatively short period of time. The data exposure time is still shorter with cameras provided with means for automatically winding up the film with earlier timing after the shutter has been closed. Such limitations on the data exposure time give rise to the necessity of passing a greater current through the light source lamp for data recording to give increased brightness to the lamp. A dash of increased current then flows through the lamp, recording the life of the lamp and the reliability of the device.

When a prolonged data exposure time is used to overcome the problem, a blurred data image will inevitably result depending on the film winding timing if the film is wound up automatically or even if it is wound manually. Alternatively there is the need to delay the film winding timing, but this entails difficulty in taking photographs with proper timing or in photographing a moving or changing subject in succession.

Furthermore, the data exposure time control electric circuit of the device includes many switches which function mechanically. Such mechanical switches not only make the device complex but also are costly because they require the use of expensive metal, such as platinum, which gives inproved corrosion resistance and enhanced reliability to the switches.

U.S. Pat. No. 3,953,868 discloses another device including a data exposure light source which is energized by closing the synchronization contact of the camera for firing flash bulbs. However, since the synchronization contact is closed when the shutter is fully opened, the data exposure time is limited to a relatively short period of time also in this case. The device therefore has the same drawback as the prior art described above.

SUMMARY OF THE INVENTION

An object of this invention is to provide a data recording device which is useful for cameras equipped with an automatic focusing mechanism and in which the movement of the focusing mechanism is utilized to overcome the foregoing drawbacks of the prior art and prolong the data exposure time to the greatest possible extent.

Another object of the invention is to provide a control circuit for recording data which includes a minimized number of mechanically operable switching elements and which is thereby made available at a reduced cost.

In the device of the present invention a data recording operation is initiated in response to a lens position signal for automatically focusing the camera. Since the data recording operation is started at an early stage of the usual automatic focusing movement preceding the release of the shutter, an increased amount of time is available for the data recording which may be terminated before the shutter closes. Accordingly, the present device permits sufficient exposure time for recording data even if the film is wound up automatically as soon as the shutter has closed. This renders the light source lamp serviceable at a reduced brightness, consequently providing a prolonged life to the lamp and improved reliability to the camera. Because the desired data are completely recorded before the film is wound up following a usual photograph taking procedure, the data can be recorded as a distinct image. No objections will result even when the film is wound up within a short period of time after taking a photograph as when taking photographs in succession at a high speed.

Further according to this invention, the input assembly for initiating the device into a data recording operation has a simplified construction, and the control circuit can be composed only of an integrated circuit, with use of a minimized number of mechanical switches.

DESCRIPTION OF THE PREFERRED EMBODIMENTS

Figure 1:
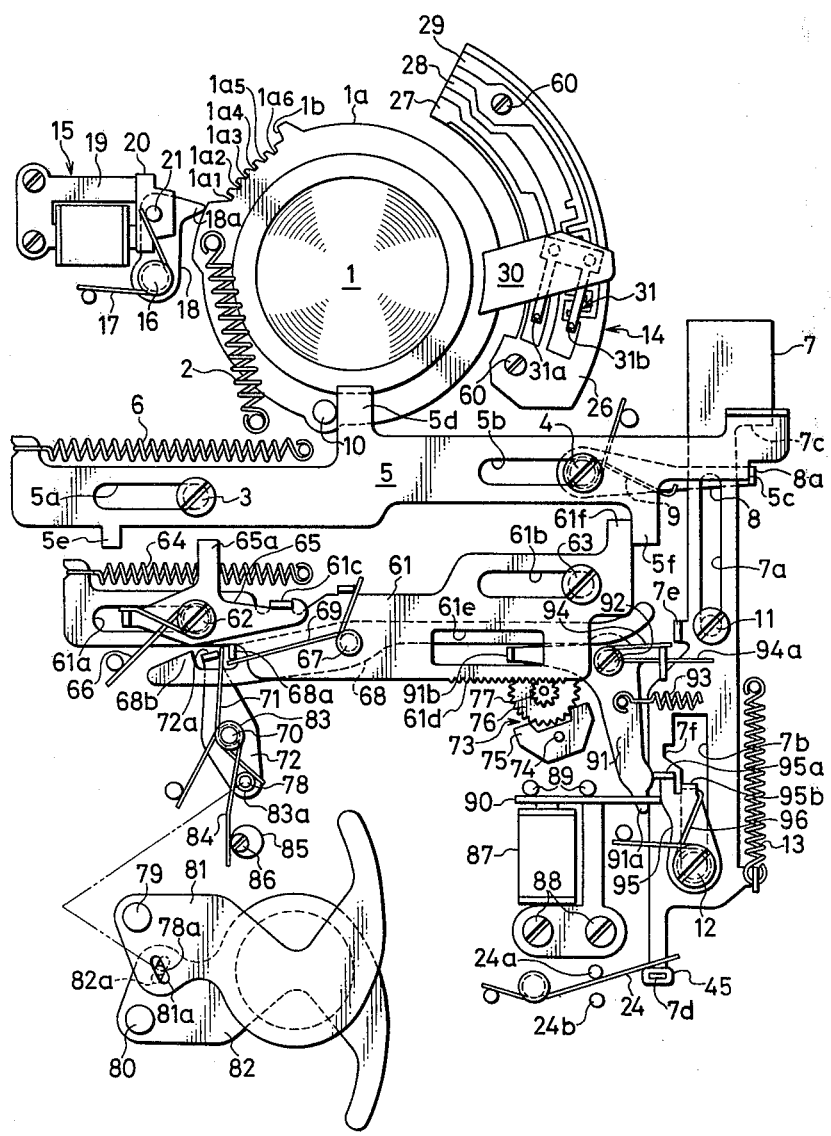
FIG. 1 is a front view showing a camera mechanism embodying the invention.

With reference to FIG. 1, a photographic lens 1, when turned, advances or retracts axially thereof for focusing. By a spring 2 acting on a lens drive ring 1a, the lens 1 is biased counterclockwise toward the infinity position (hereinafter referred to as "the second position"). Immediately below the lens 1 a lens moving member 5 is supported by pins 3, 4 engaged in slots 5a, 5b formed in the member 5 and is thereby made movable toward the left and the right. The moving member 5 is biased rightward by a spring 6 and has a vertical edge 5c at its right end. A latch lever 8 for holding the lens moving member 5 is pivoted at one end by the pin 4 and formed at the other end with a lug 8a which is biased into engagement with the edge 5c by a spring 9 acting on the lever 8 in a counterclockwise direction to hold the member 5 in its cocked position as seen in FIG. 1. The lens moving member 5 has on its upper edge a first projection 5d bearing on a pin 10 on the front side of the lens drive ring 1a against counterclockwise turn of the ring 1a. When the moving member 5 is in its cocked position shown in FIG. 1, the first projection 5d retains the drive ring 1a, i.e. the lens 1, in a clockwise extremity position (hereinafter referred to as "the first position") to which the lens 1 can be turned clockwise through an angle beyond the nearest focused position.

A shutter release member 7 vertically movably supported by pins 11, 12 engaged in slots 7a, 7b is biased upward by a spring 13 and has in an upper portion of its right edge a downward stepped portion 7c which acts on the lug 8a of the latch lever 8. In the final stage of a shutter release action for depressing the shutter release member 7 against the spring 13, the stepped portion 7c strikes the lug 8a to depress the lever 8 against the spring 9, releasing the moving member 5 from the lug 8a, i.e. from its cocked position.

When the released moving member 5 moves from the cocked position rightward under the action of the spring 6, the spring 2 drives the lens 1 counterclockwise from the first position toward the second position, with the pin 10 following the first projection 5d of the moving member 5.

On the right side of the lens 1, there is disposed means 14 for generating lens position signals corresponding to positions of the lens 1 during this movement. Upon the lens 1 reaching a focused position corresponding to the measured distance of a subject, the lens is prevented from further movement by arresting means 15 disposed on the left side of the lens 1.

The arresting means 15 comprises a pawl member 18 pivotably supported by a pin 16 and having a pawl 18a and a spring 17 for biasing the pawl 18a into pressing contact with the outer periphery of the drive ring 1a, and an electromagnet 19 for attracting the pawl member 18 against the action of the spring 17 to hold the member 18 in its non-operative position. Attached to the pawl member 18 by a pin 21 is a piece 20 which is attracted to the magnet 19 when the magnet is energized on closing of a power supply switch 24.

Figure 2:
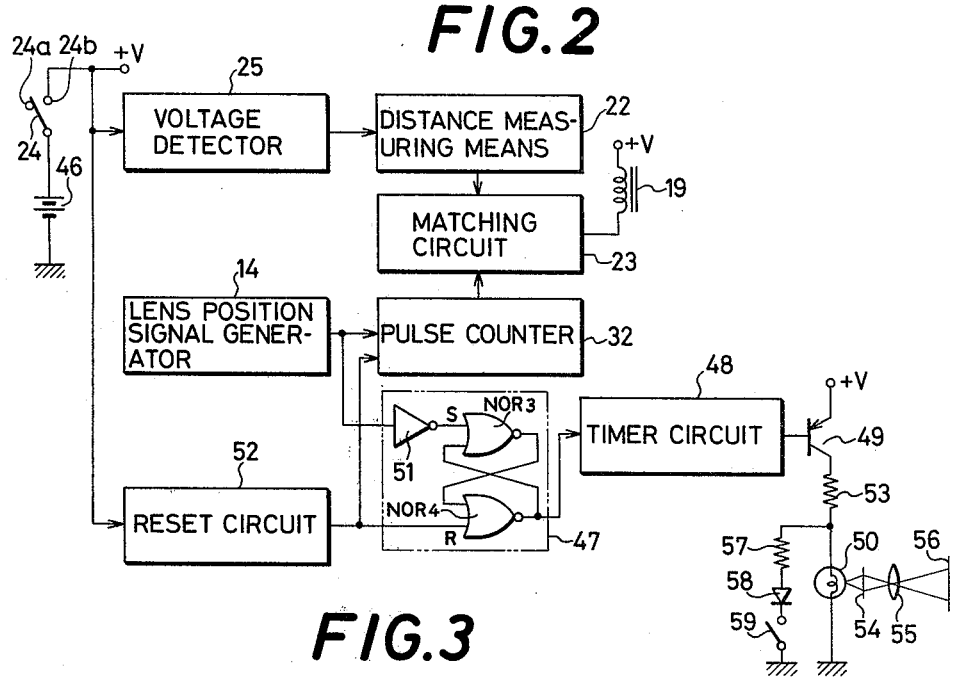
FIG. 2 is a diagram showing an example of the circuit for controlling the data recording device of the camera.

With reference to FIG. 2, means 22 for automatically measuring the subject distance produces measured distance signals, which are compared with the lens position signals from the signal generating means 14 by a matching circuit 23. When the signals from these two means are in agreement, the circuit 23 emits an inverted signal which de-energizes the magnet 19 to release the pawl member 18 from attraction.

The lens drive ring 1a is formed in its outer periphery with stop grooves $1a_1, 1a_2, \ldots 1a_6$ in which the pawl 18a of the member 18 is engageable. When the magnet 19 is de-energized to release the pawl member 18, the pawl 18a engages in one of the stop grooves $1a_1$ to $1a_6$ under the action of the spring 17, immediately arresting the lens 1 in the focused position corresponding to the subject distance. Beyond the last groove $1a_6$ further toward the infinity position, the ring 1a has a stop piece 1b projecting therefrom. When the lens 1 reaches the infinity position irrespective of whether or not the pawl member 18 is held attracted to the magnet 19, the stop piece 1b invariably engages the pawl member 18, which in turn holds the lens in the infinity position against any further movement.

With reference to FIG. 2, if the power supply voltage is not lower than a predetermined level when the power supply switch 24 is turned on, a power supply voltage detecting circuit 25 emits, for example, a high level (hereinafter referred to as "high") signal a specified time thereafter. The range of distances of the subjects to be photographed by the lens 1 is divided into a plurality of distance zones. In response to the high signal, the distance measuring means 22 detects in which of the distance zones the subject is positioned, giving the corresponding zone signal. The distance measuring means 22 may be any of those heretofore proposed. The zone signal obtained is stored in a register included in the means 22. With the present embodiment, the range of subject distances from near distance to infinity is divided into seven distance zones, and the numerical values of 1, 2, . . . 7 are used for the near to distant zones in this order as the binary signals to be stored in the register. The six stop grooves $1a_1$ to $1a_6$ are formed for these zones except the infinity position.

Figure 3:
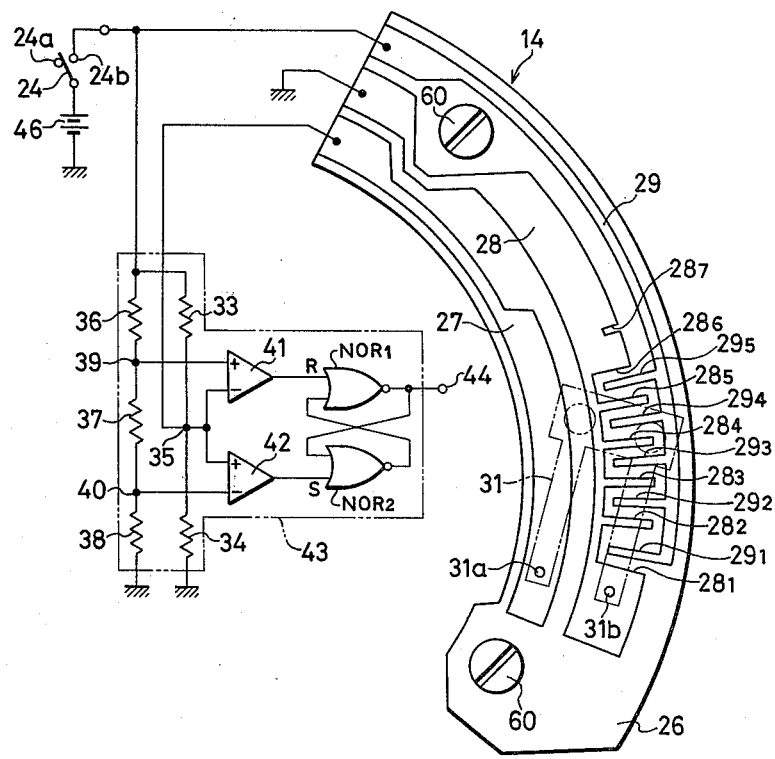
FIG. 3 is a diagram showing the construction of an example of lens position signal generating means and the electric circuit thereof.

The lens position signal generating means 14 comprises an insulating base plate 26 disposed on the right side of the lens 1 and three, first to third circular arc electrodes 28, 29, 27 formed on the base plate 26 concentrically with the lens 1, for example, by etching. The adjacent electrodes 28 and 29 have contact pieces resembling comb teeth and extending toward each other (FIGS. 1 and 3). A support member 30 projecting from the ring 1a has a slider 31 provided with two contact members 31a and 31b. The contact member 31a is in sliding contact with the third electrode 27, while the other contact member 31b is adapted to alternately contact the contact pieces of the first electrode 18 and those of the second electrode 29, such that with the movement of the slider 31 due to the focusing movement of the lens 1, the third electrode 27 is connected to the first electrode 28 or the second electrode 29 alternatively and alternately, whereby a pulse signal is generated in each stage of the movement of the lens 1 from the first position to the second position. A counter 32 counts the pulse signals from the position signal generating means 14. When a particular lens position signal from the counter 32 agrees with the distance signal from the subject distance measuring means 22, the matching circuit 23 delivers an inverted output to de-energize the magnet 19.

The first position of the lens 1 is set outside the actual focusing range from the nearest focused position to the infinity focused position, i.e. some distance clockwise away from the nearest focused position where the focusing movement is usually initiated, such that even when the subject distance is the nearest in which case no focusing movement is generally needed, the lens 1 is invariably preturned through an angle from the first position to the nearest focused position.

When the lens 1 is preturned to the nearest position, the lens position signal generating means 14 generates a corresponding signal. As shown in detail in FIG. 3, the first electrode 28 has first to sixth contact pieces $28_1$ to $28_6$ arranged from the first position toward the infinity position and a cutout $28_7$ disposed beyond the sixth contact piece $28_6$ and corresponding to the second position (infinity position). The second electrode 29 has first to fifth contact pieces $29_1$ to $29_5$ extending into the spaces between the contact pieces $28_1$ to $28_6$ of the first electrode 28. The adjacent contact pieces $28_1$ and $29_1$, $29_1$ and $28_2$, $28_2$ and $29_2$, ... are spaced apart by a sufficient distance so that when the contact member 31b is slidingly moved toward the second position, the member 31b will come into contact only with the insulating base plate 26.

The first and second electrodes 28 and 29 are connected to the negative and positive terminals of a power supply 46 respectively. The third electrode 27 is connected to the junction 35 between resistors 33 and 34. In parallel with the series circuit of these resistors 33 and 34, there is a series circuit comprising resistors 36, 37 and 38. The inverted input terminal of a voltage comparing circuit 41 and the non-inverted input terminal of a voltage comparing circuit 42 are connected to the junctions 39 and 40 of the resistors 36 to 38, respectively. The other input terminal of each of the circuits 41 and 42 is connected to the junction 35. The output of the circuit 41 serving as a set signal and the output of the circuit 42 as a reset signal are fed, respectively, to a pair of NOR circuits $NOR_1$ and $NOR_2$ constituting an R-S flip-flop circuit as seen in FIG. 3. Thus the resistors 33, 34, 36, 37 and 38, voltage comparing circuits 41, 42 and circuits $NOR_1$, $NOR_2$ provide a chatter-free circuit 43.

Even when the contact member 31b chatters upon contacting the contact pieces $28_1$ to $28_6$ and $29_1$ to $29_5$ intermittently during the movement of the slider 31, the output terminal 41 of the circuit $NOR_1$ delivers chatter-free stable pulse signals as lens position signals. The resistors 33 and 34 are equal in resistivity, and the resistors 36 and 38 are also equal in resistivity.

As shown in FIG. 1, the power supply switch 24 comprises a spring member which is usually held pulled up out of contact with a contact point 24a by a lug 7d at the lower end of the shutter release member 7. The lug 7d has an insulating tube 45 fitted therearound. When the release member 7 is depressed, the spring member follows this movement to come into contact with a contact point 24b in the initial stage of the shutter release action, that is, sufficiently before the lens moving member 5 is released. The base plate is fixed in place by screws 60 shown in FIGS. 1 and 3.

Figure 4:
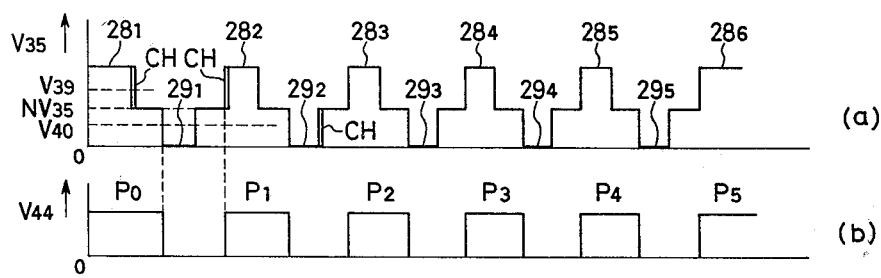
FIG. 4 is a diagram showing the operation of the signal generating means.

FIG. 4 shows variations in the voltage $V_{35}$ at the junction 35 of the chatter-free circuit 43 (FIG. 4 (a)), and variations in the output voltage $V_{44}$ at the output terminal 44 of the circuit (FIG. 4 (b)). The voltage levels $V_{39}$ and $V_{40}$ at the junctions 39 and 40 are each constant. After the switch 24 is closed initially upon shutter release, the voltage level $V_{35}$ at the junction 35 is high as indicated at $28_1$ to $28_6$ in FIG. 4 (a) when the contact member 31b is in contact with the contact pieces $28_1$ to $28_6$ of the first electrode 28, and is low as designated at $29_1$ to $29_5$ in FIG. 4 (a) when the contact member 31b is in contact with the contact pieces $29_1$ to $29_5$ of the second electrode 29. When the contact member 31b is in contact with the base plate 26 only between the contact pieces $28_1$ to $28_6$ and $29_1$ to $29_5$, the junction 35 has an intermediate voltage level $NV_{35}$. The high and low levels appear alternately above and below the intermediate level.

When the contact member 31b transfers from one of the contact pieces of the first and second electrodes 28 and 29 onto the base plate 26 or from the base plate 26 onto the contact piece with the turn of the lens 1, the contact member 31b will be shaken and fail to come into smooth contact with the contact piece or base plate, consequently chattering as indicated at CH in FIG. 4 (a). However, the constant voltages $V_{39}$, $V_{40}$ at the junctions 39, 40 and the varying voltages $V_{35}$ at the junction 35 are fed to the voltage comparing circuits 41, 42, which deliver outputs to the circuits $NOR_1$, $NOR_2$ of the R-S flip-flop circuit. Accordingly when the voltage $V_{35}$ at the junction 35 rises from the intermediate level $NV_{35}$ to the high level $28_1$ to $28_6$, a high level is available, which is maintained until the voltage falls from $NV_{35}$ to the low level $29_1$ to $29_5$, whereupon the voltage $V_{44}$ changes from the high level to a low level. Thus pulse signals are available at the output terminal 44 of the circuit $NOR_1$. Consequently when the contact member 31b transfers from the contact pieces $28_1$, ... of the first electrode 28 onto the contact pieces $29_1$, ... of the second electrode 29, the chatter-free circuit 43 delivers chatter-free pulse signals $P_0$ to $P_5$, one at a time, as seen in FIG. 4 (b). These signals serve as lens position signals.

Only upon closing of the switch 24 by shutter release, a reset circuit 52 emits a high signal, which in turn resets the pulse counter 32, whereby the counter is set at a count 1. The counter 32 counts upon rise of each of the pulse signals given by the means 14. The counter 32 remains set at the count 1 by the reset signal from the reset circuit 52 although the pulse signal $P_0$ is produced upon closing of the switch 24.

If the distance signal from the distance measuring means 22 is 1 at this time, the matching circuit 23 immediately gives an inverted output to de-energize the electromagnet 19. The de-energization is initiated with the closing of the switch 24 to release the pawl member 18 from the magnet before the lens reaches the nearest focused position corresponding to the distance signal 1. Accordingly the lens 1 is preturnable from the first position to the nearest focused position with the pawl 18a merely pressed against a grooveless portion of the outer periphery of the ring 1a. When the lens 1 reaches the nearest position, the pawl 1a engages in the first stop groove $1a_1$ to retain the lens 1 in this position. For distance signals 2 to 6, the pulse counter 32 counts the pulse every time the lens 1 reaches each focused position corresponding to one of the signals 2 to 6, upon rise of the pulse concerned. When the count agrees with one of the distance signals 2 to 6, the matching circuit 23 delivers an inverted output and de-energizes the magnet 19, causing the pawl 18a to engage in one of the stop grooves $1a_2$ to $1a_6$ corresponding to the distance signal, whereby the lens 1 is arrested in the desired focused position.

The lens position signal generating means 14 produces no signals other than the pulse signals $P_0$ to $P_5$. In the case of the distance signal 7, the matching circuit 23 does not give any inverted output, but the pawl 18a of the pawl member 18 held attracted to the magnet 19 strikes the stop piece 1b on the ring 1a, whereby the lens 1 is held in the infinity focused position, i.e. the second position.

The pulse signals from the position signal generating means 14 are given also to a pulse detecting circuit 47. When the circuit 47 receives the signal corresponding to the preturn of the lens 1, a transistor 49 is caused to contact for a specified period of time by a timer circuit 48 to turn on a light source lamp 50.

The pulse detecting circuit 47 comprises an inverter circuit 51 for receiving pulse signals from the position signal generating means 14, and an R-S flip-flop circuit comprising a NOR circuit $NOR_3$ for receiving a signal from the inverter circuit 51 as a set signal and another NOR circuit $NOR_4$ for receiving a reset signal (high output) from the reset circuit 52. After the circuit 52 delivers a reset signal upon closing of the switch 24, the lens 1 starts to turn from the first position to the nearest focused position. Before this preturn is completed, the contact member 31b comes into contact with the piece $29_1$ of the second electrode 29, whereby the pulse $P_0$ produced from the means 14 at a high level with the closing of the switch 24 is caused to fall. In response to the turn of the output from the means 14 from high to low, the output of the circuit $NOR_4$ is inverted from low to high to energize the timer circuit 48 and turn on the data recording light source lamp 50.

The pulse $P_0$ from the means 14 is produced by the preturn of the lens 1 from the first position to the nearest focused position where the actual focusing movement is initiated.

One shot circuit including a CR time constant circuit, a digital timer for counting a specified number of pulses, etc. are usable as the timer circuit 48. The circuit 48 functions to hold the transistor 49 in conduction for a predetermined period of time. While the transistor 49 is in conduction, the lamp 50 is kept energized through a current limiting resistor 53 to illuminate data 54, whereby a film 56 is exposed to the data through a lens 55.

A series circuit comprising a resistor 57, diode 58 and switch 59 connected in series with the lamp 50 is used for films of increased sensitivity, such that when the switch 59 is closed, a reduced current flows through the lamp 50 for proper exposure. The exposure is controllable also by adjusting the resistivity of the resistor 53 when the resistor is a variable one, or by adjusting the time set on the timer circuit 48 if the desired exposure time is within an allowable range.

With the present embodiment, the contact piece $29_1$ between the contact pieces $28_1$ and $28_2$ of the first electrode 28 is located closer to the contact piece $28_1$, so that even if the base plate 26 around the lens 1 is positioned some distance toward the counterclockwise direction, the contact member 31b will invariably come into contact with the second electrode piece $29_1$ to cause the pulse $P_0$ to fall and initiate the data recording operation, before the lens reaches the nearest focused position for the completion of its preturn.

The shutter mechanism generally shown in FIG. 1 comprises a shutter starting member 61 disposed below the lens moving member 5 in parallel thereto and slidably supported by pins 62, 63 engaged in slots 61a, 61b. The starting member 61 is biased rightward in FIG. 1 by a spring 64. A lever 65 pivoted by the pint 62 and biased counterclockwise by a spring 66 engages a lug 61c on the upper edge of the starting member 61 to hold the member 61 in its cocked position shown in FIG. 1. The engaging lever 65 has a driven arm 65a opposed to a second projection 5e on the lower edge of the lens moving member 5 and is thereby made movable by the second projecton 5e in the final stage of the rightward movement of the lens moving member 5. When so moved, the engaging lever 65 turns clockwise against the spring 66, releasing the shutter starting member 61.

A shutter operating lever 68 is pivoted at an intermediate portion thereof by a pin 67 on the midportion of the starting member 61. The lever 68 is biased clockwise by a spring 69 and formed at its one end with a lug 68a bearing against the lower edge of the starting member 61. A shutter drive lever 72 pivotably supported by a pin 70 at its center portion and biased counterclockwise by a spring 71 has a lug 72a. When the member 61 is released into a rightward movement, a hook portion 68b of the lever 68 engages the lug 72a to turn the lever 72 clockwise against the spring 71.

The shutter starting member 61 has on its lower edge a rack 61d in engagement with a governor 73, which comprises an engaging member 75 pivotally supported by a pin 74, a gear 76 in engagement with the member 75 and a pinion 77 integral with the gear 76 and meshing with the rack 61d. The governor 73 exerts a braking force on the rightward movement of the member 61 to turn the drive lever 72 at a reduced speed.

Shutter sectors 81, 82 pivoted, each at its one end, by pins 79, 80 have driven grooves 81a, 82a crossing each other. The shutter drive lever 72 has at the other end thereof a drive pin 78 the free end of which is engaged in the crossed portions of the grooves 81a, 82a, so that when turned clockwise, the lever 72 gradually opens the sectors 81, 82. A trigger switch 84 in the form of a spring is attached to an insulating tube 83 on the pin 70 of the lever 72. When the lever 72 is in its cocked position (FIG. 1), the switch 84 is closed in contact with a contact 85. In the initial stage of the turn of the lever 72, the drive pin 78 having an insulating tube 83a fitted therearound pushes the switch 84 away from the contact 85 and opens the switch, whereby an unillustrated exposure time control timer circuit is initiated into operation. The contact 85 is eccentrically supported on a screw 86. When the contact 85 is turned about the screw 86, the position of the contact of the switch 84 with the contact 85 is adjustable.

A shutter closing electromagnet 87 controllable by the unillustrated timer circuit is fixed in position by screws 88, below the starting member 61 and on the left side of the shutter release member 7. An attractable piece 90, slidable laterally, is retained between the top of the magnet 87 and guide pins 89. A shutter closing lever 91 pivoted by a pin 92 has one end 91a engaged with and connected to one end of the piece 90 and the other end providing a lug 91b. The lug 91b is positioned in an aperture 61e formed in the starting member 61 and is opposed to the lower edge of the shutter operating lever 68.

A weak return spring 93 biases the lever 91 counterclockwise to urge the lug 91b away from the lower edge of the shutter operating lever 68 and to position the piece 90, in engagement with its one end 91a, on the top of the magnet 87. A spring 94 provided on the pin 92 of the lever 91 has one end 94a extending to a position below an operating portion 7e on the left side edge of the shutter release member 7. On shutter release, the portion 7e depresses the end 94a to cock the spring 94, biasing the closing member 91 clockwise by a greater force than the spring 93.

The magnet 87 is energized with the closing of the switch 24 to attract the piece 90 in the standby position shown in FIG. 1, whereby the shutter closing lever 91 is retained in the position shown in FIG. 1. When the exposure time control timer circuit gives an inverted output upon lapse of time in accordance with the luminance of the subject, the magnet 87 is de-energized to release the piece 90 and the closing lever 91, whereupon the spring 94 turns the lever 91 clockwise. Whereas the operating lever 68 moving rightward with the starting member 61 is causing the drive lever 72 to progressively open the shutter sectors 81, 82, the lug 91b pushes up a right end portion of the lever 68. The counterclockwise turn of the lever 68 releases the lug 72a of the drive lever 72 from the hook portion 72a, whereupon the lever 72 quickely returns counterclockwise under the action of the spring 71 and closes the sectors 81, 82 to complete the exposure.

The lens moving member 5 is formed on its lower edge with a cocking projection 5f, which pushes a driven projection 61f on the upper edge of the shutter starting member 61 to cock the member 61 when the moving member 5 is moved to the cocked position in FIG. 1 by a film winding action. The return of the shutter release member 7 and cocking of the shutter return the automatic focusing mechanism and the shutter mechanism to the cocked positions shown in FIG. 1.

If the magnet 87 is not fully energized and fails to attract the piece 90 due to an insufficient power supply voltage when the switch 24 is closed in the initial stage of shutter release, the camera is unable to take a photograph. To prevent this, a lock lever 95 is provided to prevent shutter release. The lock lever 95 is pivoted by the pin 12 and biased counterclockwise by a spring 96. The lever 95 has a lug 95a bearing on the right side edge of the shutter closing lever 91 to follow the clockwise turn of the lever 91. The lever 95 further has a lug 95b positioned in the slot 7b of the release member 7. The inner left side edge of the release member 7 defining the slot 7b is formed, some distance above the portion thereof in contact with the lug 95b, with a recess 7f in which the lug 95b is engageable. If the piece 90 is not held attracted to the magnet 87, the shutter closing lever 91 turns clockwise with the piece 90 simultaneously when the spring 94 is cocked in the initial stage of a shutter release action. Consequently the lock lever 95 following the lever 91 turns clockwise and brings the lug 95b into engagement with the recessed portion 7f of the release member 7, restraining the release member 7 from moving further downward and thereby preventing the release of the lens moving member 5 to hold the focusing mechanism and the shutter out of movement.

The camera operates in the following manner. When the shutter release member 7 is depressed, the switch 24 is closed first, energizing the magnet 19 which in turn attracts the pawl member 18 if the power supply voltage is at a proper level. At the same time, the shutter closing electromagnet 87 is also energized to hold the piece 90 in the position shown in FIG. 1 by attraction. In a specified period of time, the power supply voltage detecting circuit 25 feeds a high output to the subject distance measuring means 22, which measures the subject distance. The means 22 stores a distance signal, corresponding to the subject distance, in its register and feeds the signal to the matching circuit 23. The reset circuit 52 gives a reset signal to the pulse counter 32 and to the circuit $NOR_2$ of the pulse detecting circuit 47, setting the counter 32 at 1 and causing the circuit 47 to deliver a low output.

Subsequently the release member 7 starts to depress the end 94a of the spring 94 on the shutter closing lever 91 to cock the spring 94.

When further depressed, the shutter release member 7 pushes the latch lever 8 down to release the lens moving member 5, whereupon the member 5 moves rightward from the position shown in FIG. 1. Accordingly the lens 1 turns counterclockwise with the slider 31 from the first position toward the second position. Before the lens 1 reaches the nearest focused position, the slider 31b moves over the contact piece $28_1$ of the first electrode 28 and the base plate 26 into contact with the contact piece $29_1$ of the second electrode 29, with the result that the circuit $NOR_1$ of the position signal generating means 14 producing a high output upon closing of the switch 24 inverts its output to a low output to complete a pulse signal $P_0$. In response to the fall of the pulse signal $P_0$, the circuit $NOR_4$ of the pulse detecting circuit 47 changes its output from low to high, energizing the timer circuit 48 to turn on the light source lamp 50, which starts to expose the film 56 to the desired data. Upon the lapse of the time set by the timer circuit 48, the lamp 50 goes off to finish recording the data.

If the distance signal is "1," the matching circuit 23 immediately inverts its output to de-energize the magnet 19 since the counter 32 is set at 1. Accordingly the pawl member 18 holds its pawl 18a pressed against the outer periphery of the lens drive ring 1a until the lens reaches the nearest focused position, i.e. during the pre-movement of the lens 1. Upon the lens reaching the nearest focused position, therefore, the pawl 18a engages in the stop groove $1a_1$ in the outer periphery of the ring 1a to arrest the lens 1 in the focused position.

When the distance signal is 2 to 6, the counter 32 counts pulse signals $P_1$ to $P_5$ emitted from the circuit $NOR_1$ of the position signal generating means 14, upon rise of each pulse every time the contact member 31b comes into contact with the contact piece ($28_2$ to $28_6$) of the first electrode 28 with a further turn of the lens 1. When the count agrees with the distance signal, the matching circuit 23 inverts its output to de-energize the magnet 19, whereupon the pawl member 18 engages in one of the stop grooves $1a_2$ to $1a_6$ corresponding to the distance signal (2 to 6) to arrest the lens in the proper focused position. Since the counter 32 does not count more than 5, the count does not agree with the distance signal of 7, and the matching circuit 23 does not give an inverted signal, so that the pawl member 18 remains attracted to the magnet 19. Upon the lens 1 reaching the second position, i.e. the infinity focused position, the stop piece 1b on the ring 1a strikes the pawl member 18, whereby the lens 1 is focused. When the lens 1 reaches the second position, the contact member 31b of the slider 31 is positioned in the cutout $28_7$ of the first electrode 28 in contact with the insulating base plate 26 only, disconnecting the third electrode 27 from the first and second electrodes 28 and 29.

Independently of the foregoing automatic focusing movement, the lens moving member 5 further moves rightward to its terminal position defined by the engagement of the pins 3, 4 with the slotted portions 5a, 5b. In the final stage of this rightward movement, namely when or after the member 5 has reached to the position corresponding to the second position of the lens 1, the member 5 pushes the engaging lever 65 with its second projection 5e. This movement releases the shutter starting member 61, permitting the member 61 to move rightward from the position in FIG. 1 and causing the shutter operating lever 68 and shutter drive lever 7 to open the shutter sectors 81 and 82. Simultaneously with the opening of the shutter, the lever 72 turns off the trigger switch 84 of the exposure time control timer circuit (not shown). When a period of time in accordance with the luminance of the subject has elapsed after the opening of the trigger switch, the control timer circuit de-energizes the shutter closing magnet 87, whereupon the shutter closing lever 91 functions to disengage the operating lever 68 from the drive lever 72 and return the sectors 81 and 82 to the closed position. Now the photograph taking operation is completed.

The parts are brought to the cocked state shown in FIG. 1 in operative relation to the subsequent film winding action.

When the power supply voltage is lower than the specified level, the power supply voltage detecting circuit 25 does not deliver a high output, so that the subject distance measuring means 22 remain out of operation. Further when the shutter colsing magnet 87 is not fully energized, the lock lever 95 restrains the release member 7 from moving down to hold the focusing mechanism and the shutter out of operation. The lock lever therefore eliminates failures in taking photographs due to a low power supply voltage and is also serviceable as a battery checker for warning the user of the insufficient power source voltage.

The operation of the automatic focusing mechanism takes, for example, about 40 m·sec., and the subsequent opening and closing of the shutter about 10 m·sec. The recording of data, when taking 50 m·sec., can be completed simultaneously with the completion of the exposure of the film to the subject. Thus the lamp can be timed to light up earlier than heretofore possible by a period of time corresponding to the operation time of the focusing mechanism. This makes it possible to correspondingly prolong the data recording time and reduce the brightness of the lamp. Even when the film is wound up, for example, automatically immediately after taking a photograph, a distinct image of data can be recorded on the film. Further even when the lamp is adapted to light up for 100 m·sec. to reduce the brightness of the lamp, data exposure can be completed in about 50 m·sec. after the completion of the exposure of the film to the subject. Such an extension of time poses no problem in taking photographs even if the film is wound up mannually immediately after the shutter has been closed.

Figure 5:
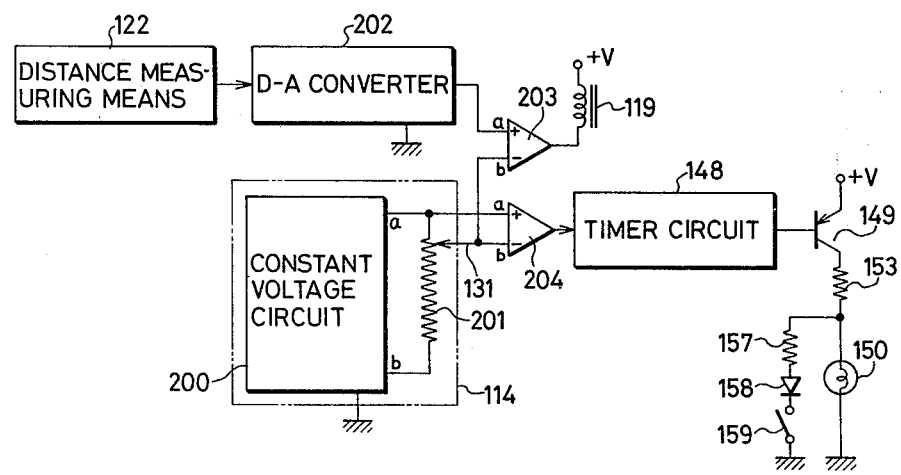
FIG. 5 is a diagram showing another example of the control circuit for the data recording device.

FIG. 5 shows another lens position signal generating means which is adapted to produce an analog voltage in place of pulse signals corresponding to distances of movement of the photographic lens. The position signal generating means 114 comprises a constant voltage circuit 200 and a poteniometer 201 for producing an analog voltage. An automatic subject distance measuring means 122, similar to the one already described, generates as distance signals binary signals 1, 2, . . . , which are converted by a D-A converter circuit 202 to analog voltage signals. The analog distance signals are applied to a terminal a of a voltage comparing circuit 203.

The constant voltage circuit 200 of the means 114 delivers constant level voltages from its terminals a and b. The potentiometer 201 is connected to these terminals a and b to apply a constant voltage to the potentiometer 201. The potentiometer 201 is disposed in a circular arc form in the same position as the first to third electrodes already described in place of these electrodes and has a slider 131 which is movable from one end of the potentiometer connected to the terminal a toward the other end thereof connected to the terminal b, with the movement of the lens from the first position to the second position. The position of the slider 131 corresponding to the first position of the lens is at the above-mentioned one end connected to the terminal a as illustrated in FIG. 5. At this position, the potentiometer delivers the voltage available at the terminal a of the circuit 200.

Accordingly the potentiometer 201 generates analog lens position signals corresponding to the positions of the lens during the movement of the lens from the first position to the second position including the pre-movement of the lens to the nearest focused position. The signals are fed to the terminal b of the voltage comparing circuit 203 and to the terminal b of another voltage comparing circuit 204. The constant voltage signal of the circuit 200 is delivered from its terminal a to the terminal a of the circuit 204.

When the position signal given to the circuit 203 by the means 122 via the D-A converter circuit 202 agrees with a lens position signal delivered from the slider 131 to the circuit 203, the circuit 203 inverts its output to de-energize an electromagnet 119, which in turn arrests the lens in the position corresponding to the distance signal for automatic focusing. The output of the potentiometer is so adjusted that even when the output level of the potentiometer reduces due to the movement of the slider 131 from one end of the potentiometer toward the other end thereof with the pre-movement of the lens from the first position, the output does not agree with any of the distance signals before the lens reaches the actual nearest focused position. In the meantime, therefore, the voltage comparing circuit 203 does not give an inverted output.

On the other hand, when the output of the potentiometer 201 decreases to a predetermined voltage before the lens reaches the actual focusing range, due to the initial movement of the slider 131 with the pre-movement of the lens, the voltage comparing circuit 204 inverts its output from low to high and energizes a data exposure timer circuit 148, which causes a transistor 149 to conduct for a set period of time to turn on a data recording light source lamp 150. Indicated at 153 is a current limiting resistor, at 157 a current limiting resistor for use with high-speed films, at 158 a diode and at 159 a switch.

The voltage comparing circuit 204 for generating the timing signal for initiating the data recording operation can be provided on the same semiconductor integrated circuit board as the other semiconductor circuits, so that in practice no special input unit is needed for generating the timing signal.

It is critical that at whatever position the lens may be automatically focused, the lens position signal generating means for focusing provides a signal for initiating the data recording operation during the pre-movement of the lens preceding the usual focusing movement.

The first position and the second position in the foregoing embodiments are determined as desired in accordance with the kind of the photographic lens used. The first position can be provided in the vicinity of the infinity focused position, and the second position at the nearest focused position.

What is claimed is:

1. In a camera including means for measuring the distance of an object for generating an electric distance signal corresponding to the distance measured;

a photographic lens movable for focusing from a first position to a second position in response to a manual release operation;

lens position signal generating means operatively related to the movement of the lens for generating an electric lens position signal corresponding to the position of the lens which is thus being moved;

a circuit arranged to receive both of said signals for producing a stop signal when the lens position signal attains a predetermined relationship with the distance signal;

arresting means operable upon receipt of the stop signal from the circuit for arresting the lens at the focused position; and a shutter operable after the arresting of the lens by said arresting means;

a data recording device for recording data on a photographic film comprising:

a data recording light source; and an energizing circuit operable for energizing said light source in response to a part of the lens position signal generated at an early stage of the movement of said lens from the first position to the second position.

2. A device as defined in claim 1 wherein the lens position signal generating means comprises a pulse generator generating a train of pulses as said lens position signal, wherein each of said pulses corresponds to a different position of said lens, and wherein said energizing circuit is brought into operation in response to a first one of said pulses generated by the pulse generator.

3. A device as defined in claim 2 wherein the energizing circuit includes a timer circuit which is responsive to the first pulse for energizing said data recording light source for a predetermined period of time.

4. A device as defined in claim 3 wherein the pulse generator includes a slide movable with the lens, and an electrode having contact pieces in the form of comb teeth along the path of movement of the slide, whereby when the slide comes into contact with one of said contact pieces, the pulse generator generates a pulse of said train.

5. A device as defined in claim 4 wherein the first position of the photographic lens is set out of the actual focusing range of the lens from the nearest focused position to the infinity focused position, and the pulse generator further includes a contact piece arranged adjacent to the comb teeth contact pieces so as to be contacted by the slide when the photographic lens is in the first position, whereby the pulse generator generates the first pulse with said contact piece contacted by said slide and said driving circuit is responsive to the trailing edge of the first pulse.

6. A device as defined in claim 1 wherein the lens position signal generating means comprises a potentiometer having a slide movable with the lens and producing an analog voltage signal varying with the position of the slide as the lens position signal and said driving circuit is responsive to an early part of voltage variation in the analog voltage signal from the potentiometer.

* * * * *